United States Patent [19]

Weimer et al.

[11] Patent Number: 4,522,117
[45] Date of Patent: Jun. 11, 1985

[54] APPARATUS FOR PREPARING SCRAMBLED EGGS

[75] Inventors: Ralph E. Weimer, Lombard; Thaddeus J. Kalowski, Lisle; Robert A. Novy, LaGrange Park, all of Ill.

[73] Assignee: Restaurant Technology, Inc., Oakbrook, Ill.

[21] Appl. No.: 549,279

[22] Filed: Nov. 7, 1983

Related U.S. Application Data

[63] Continuation-in-part of Ser. No. 355,687, Mar. 8, 1982, Pat. No. 4,433,001.

[51] Int. Cl.³ .............................................. A47J 29/00
[52] U.S. Cl. ........................................ 99/348; 99/425; 99/427; 99/448; 99/449; 366/240; 426/523; 426/614
[58] Field of Search ................ 426/523, 614; 366/219, 366/240, 256; 99/348, 426, 448, 422, 425, 423, 99/449, 427, 443 R

[56] References Cited

U.S. PATENT DOCUMENTS

| 148,817 | 3/1874 | Fowler | 99/423 |
| D. 162,041 | 2/1951 | Klein | 99/426 X |
| 2,824,510 | 2/1958 | Gangwer | 99/423 |
| 3,130,664 | 4/1964 | Jarmuth | 99/425 |
| 3,298,303 | 1/1967 | Waller | 99/423 |
| 3,624,230 | 11/1971 | Robinson | 426/614 |
| 4,055,677 | 10/1977 | White | 99/423 X |
| 4,120,981 | 10/1975 | Burkhart | 426/614 X |
| 4,203,357 | 5/1980 | Vaussanvin | 99/348 X |
| 4,228,193 | 10/1980 | Schindler | 426/614 X |
| 4,345,516 | 8/1982 | Sinclair | 99/426 |

FOREIGN PATENT DOCUMENTS 1490430  6/1967  France ............................... 99/348

Primary Examiner—Billy J. Wilhite
Attorney, Agent, or Firm—Dressler, Goldsmith, Shore, Sutker & Milnamow, Ltd.

[57] ABSTRACT

An apparatus for preparing scrambled eggs on a grill surface, wherein liquid scrambled eggs mix are placed within egg rings, each having a lower edge portion in intimate contact with a heated grill surface, and the egg rings are moved repeatedly to and fro, preferably in a reciprocating motion, while maintaining the lower edge portions of the egg ring in intimate contact with the grill surface. The egg mix is rapidly moved within the confines of the egg rings, and that rapid movement is continued until the egg mix in each ring has congealed into a mass of cooked scrambled egg. A carriage mounts at least two such egg rings, and each egg ring mounts a comb-like interceptor member which engages, moves, and mixes the eggs in the egg ring as the egg ring moves to and fro. The to and fro movement which is preferably reciprocating movement, is such that it produces a wave-like motion of the liquid eggs during a first portion of the cycle of rapid movement of the eggs in the egg ring. Desirably a pair of carriages which move concurrently are provided, each of which is moveable between an operational position and a grill-cleaning position. A stager means for simultaneously depositing measured charges of eggs into each of the egg rings is provided.

16 Claims, 13 Drawing Figures

U.S. Patent  Jun. 11, 1985  Sheet 1 of 4  4,522,117
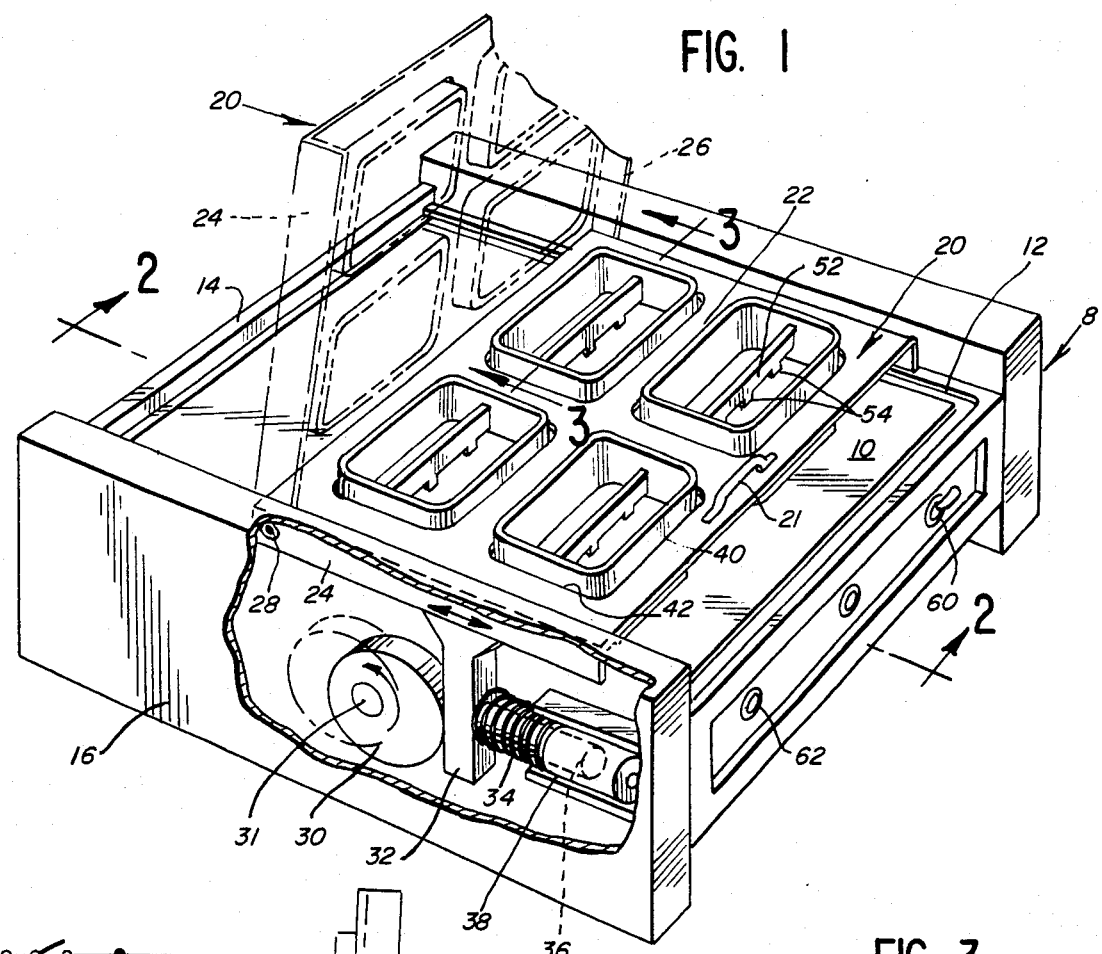
FIG. 1
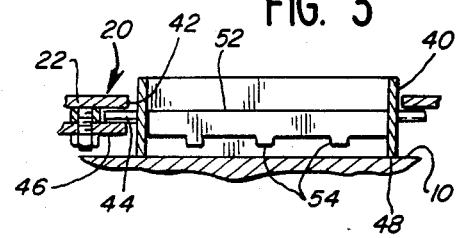
FIG. 3
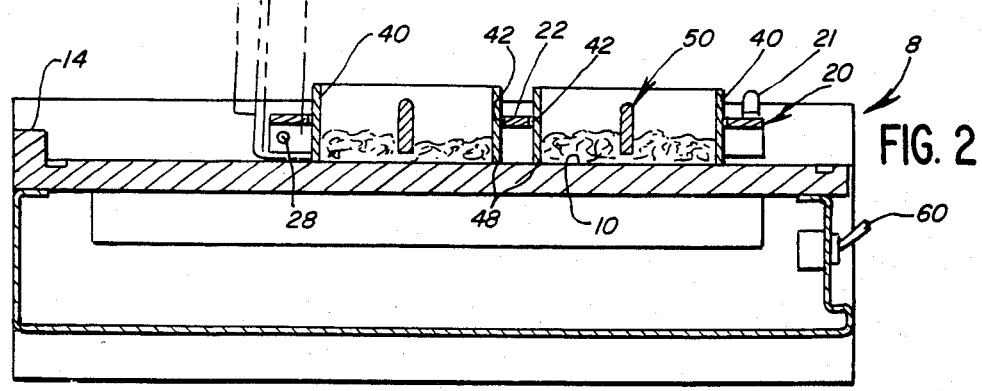
FIG. 4
FIG. 2

FIG. 5
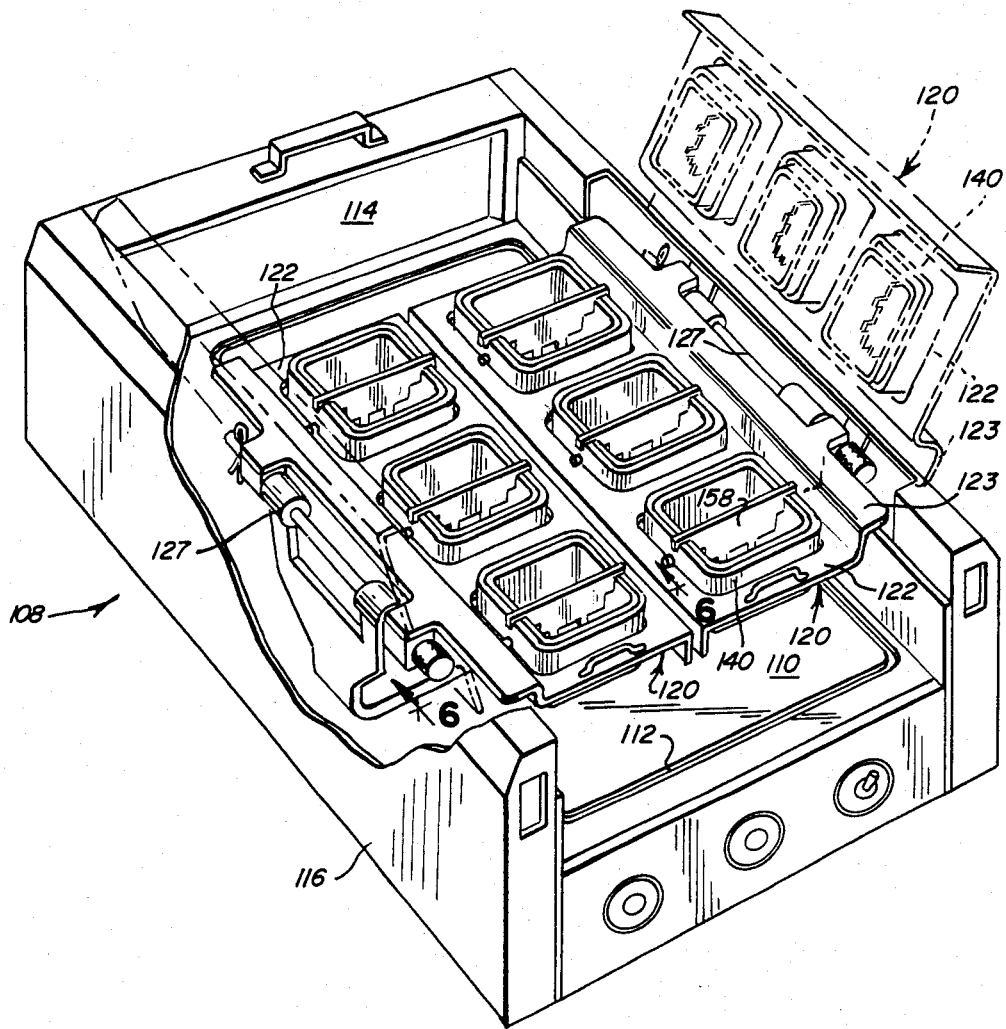
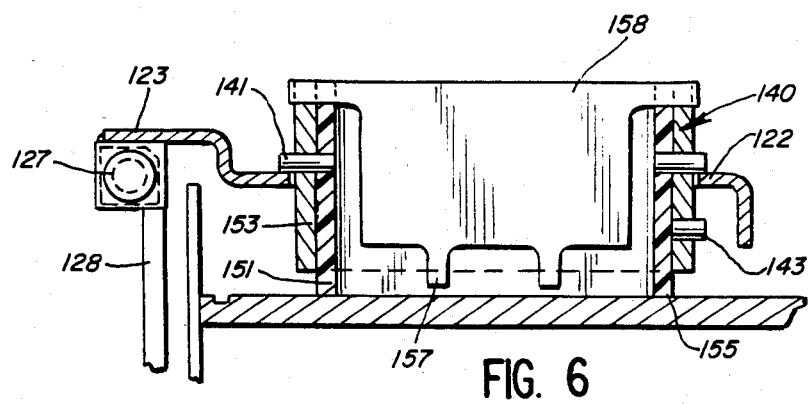
FIG. 6

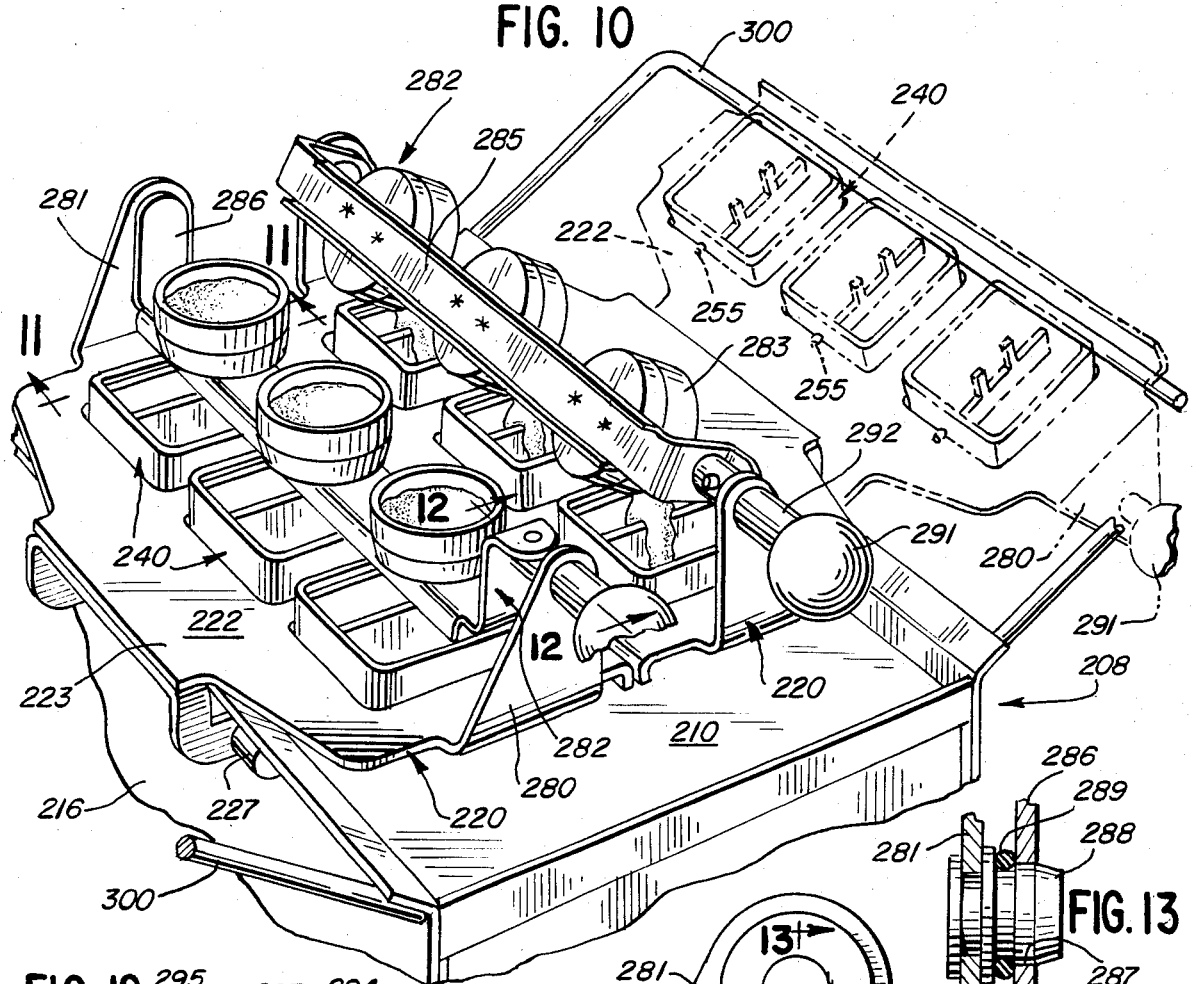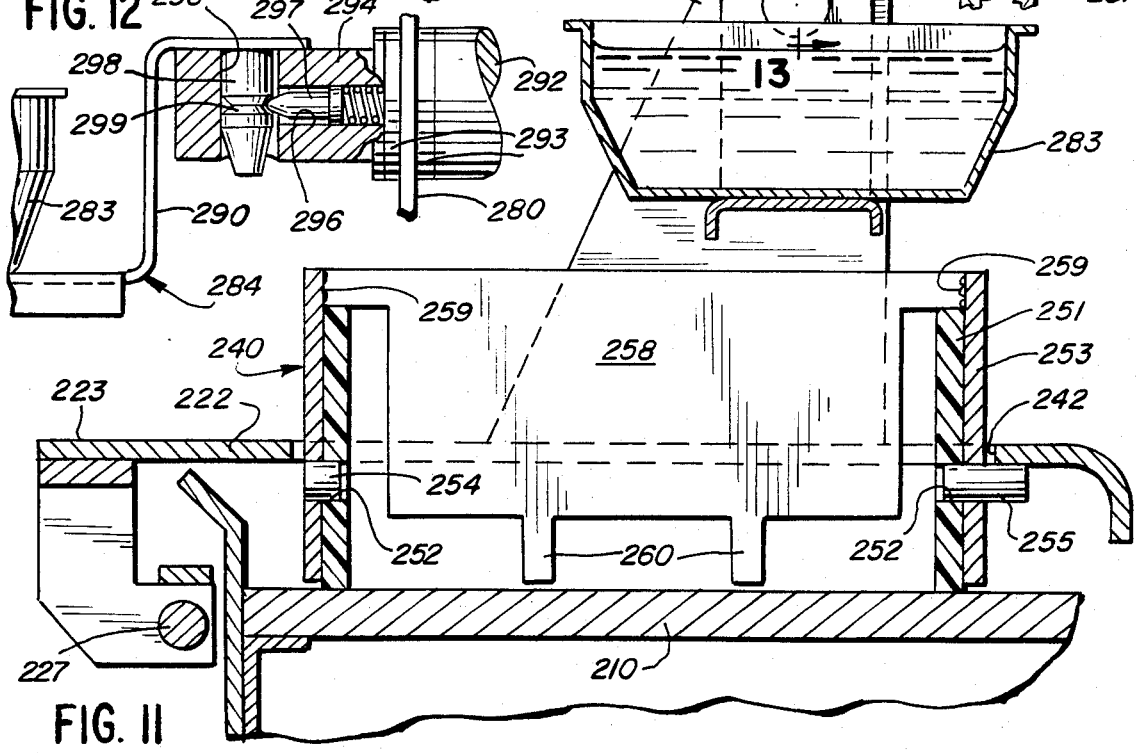

APPARATUS FOR PREPARING SCRAMBLED EGGS

BACKGROUND OF THE INVENTION

This application is a continuation-in-part of U.S. application Ser. No. 355,687, filed on Mar. 8, 1982 now U.S. Pat. No. 4,433,001.

This invention relates to an improved apparatus for producing light, fluffy, delectable scrambled eggs.

Scrambled eggs are conventionally batch-made in relatively small quantities. For institutional and high volume restaurant operations scrambled eggs are usually made on a hot grill surface. In high volume operations it is frequently deemed necessary to prepare large batches in advance, from which service is made of portions, sometimes one-half hour or more after they are made. Of course, scrambled eggs fresh off the grill taste much better than those which are held for extended periods of time.

In accordance with the present invention the preparation of multiple, service-size portions of scrambled eggs on a grill surface, hence with the conventional taste, texture and consistency of freshly prepared scrambled eggs, is provided for, and with the speed necessary for high volume restaurant operations. This may be done without jeopardizing quality, and the process and apparatus produced scrambled eggs which are consistent from batch to batch, all in a very compact space.

As such, the method and apparatus of the present invention is an improvement over the conventional method of cooking scrambled eggs on a grill, as well as over other processes, such as that described in U.S. Pat. No. 4,228,193.

BRIEF SUMMARY OF THE INVENTION

The apparatus of this invention permits and provides for the rapid and consistent preparation of individual, serving-sized portions of scrambled eggs which are moist, fluffy and delectable, and which are substantially indistinguishable from conventionally grill-prepared scrambled eggs. This is done in an area in plan view which is very compact and in multiple, individual portions automatically and consistently, thereby permitting the rapid service of customers with freshly scrambled eggs, all with a minimum of human intervention in the egg cooking process.

To that end, the invention of this application comprises an apparatus for preparing scrambled eggs in accordance with a method which includes, including the steps of placing liquid eggs to be scrambled within egg rings each having a lower edge portion in intimate contact with a heated grill surface, rapidly moving the egg rings to and fro while maintaining the lower edge portion in intimate contact with the grill surface, thereby to rapidly move said eggs within the confines of the egg rings, and continuing that rapid movement until said eggs have congealed into masses of cooked scrambled egg. Desirably the eggs are premixed and disposed in the egg rings as a liquid mix to be scrambled. Preferably the to and fro movement is reciprocating movement, and there is a plurality of egg rings in each of a pair of ring carriages, each of the rings of each carriage being provided with egg mix for the preparation of an individual, serving-sized portions of scrambled eggs. It is preferred that each egg ring mount an interceptor comb-like member, the lower edge of which is adjacent and above the grill surface, whereby the interceptor member, and preferably the downwardly extending teeth of the comb, intercepts, engages, moves and mixes the egg mix as the egg ring moves to and fro. The to and fro movement is such that it produces a wave-like motion of the liquid egg mix during a first portion of the cycle of rapid movement.

In the preferred embodiment the egg ring used in the process and apparatus is generally rectangular, and the to and fro movement is at a first rate for a first portion of the cycle of rapid movement, during which the egg mix is primarily liquid, and at a faster rate for a second portion of the cycle of rapid movement, during which the egg mix is at least partially congealed.

The apparatus of the present invention is adapted for use in carrying out the method described. As such, the apparatus comprises a grill having a grill surface and means for heating the grill surface. The grill is mounted on a frame. The frame mounts a carriage which supports at least two egg rings. Each egg ring has a lower edge portion adapted to be disposed in intimate contact with the grill surface and for movement therealong, thereby to define with the grill surface an enclosed region within the egg ring. Motor means on the frame is operatively connected to the carriage for rapidly moving the carriage and the associated egg rings to and fro along the grill surface, all so that egg mix placed in the egg rings on the grill is adapted to be confined in the egg rings and to be moved to and fro and cooked on the grill surface.

Preferably the motor means comprises means for reciprocating the carriage and the egg rings along the grill surface. Desirably each egg ring mounts a comb-like interceptor member extending across the egg ring, the lower edge of the intercept or member being adjacent and above the grill surface and at an elevation to intercept egg mix as the egg ring moves to and fro.

The motor means preferably includes means for automatically reciprocating the carriage and associated egg rings at a first rate for a first portion of the cycle of rapid movement and at a faster rate during a second portion of the cycle of rapid movement.

In its preferred form the apparatus mounts two carriages, each carrying a plurality of egg rings, each carriage being pivotally mounted at an outer side thereof for movement from an operational position to a grill cleaning position. The carriages may also mount stagers for depositing premeasured quantities of eggs simultaneously into the egg rings. The stagers are preferably removably mounted on the carriages for ease of cleaning and mount egg cups which are oscillatable from an upwardly facing egg receiving portion to a second position in which the egg cups are adapted to pour their contents into the underlying egg rings.

BRIEF DESCRIPTION OF THE DRAWINGS

Further objects, features and advantages of the present invention will become apparent from the following description and drawings, of which:

FIG. 1 is a perspective view of a first embodiment of an apparatus of the present invention for producing scrambled eggs;

FIG. 2 is a sectional view taken substantially along line 2—2 of FIG. 1;

FIG. 3 is a fragmentary cross-sectional view taken substantially along line 3—3 of FIG. 1;

FIG. 4 is a fragmentary, schematic circuit diagram;

FIG. 5 is a perspective view of a second embodiment of an apparatus of the present invention; and FIG. 6 is a fragmentary cross-sectional view of a portion of the apparatus of FIG. 5;

FIG. 10 is a perspective view of a further embodiment of an apparatus of the present invention;

FIG. 11 is a cross-sectional view taken substantially along line 11—11 of FIG. 10;

FIG. 12 is a fragmentary cross-sectional view taken substantially along line 12—12 of FIG. 10; and FIG. 13 is a fragmentary cross-sectional view taken substantially along line 13—13 of FIG. 11.

BRIEF DESCRIPTION OF THE ILLUSTRATIVE EMBODIMENTS

Figure 7:
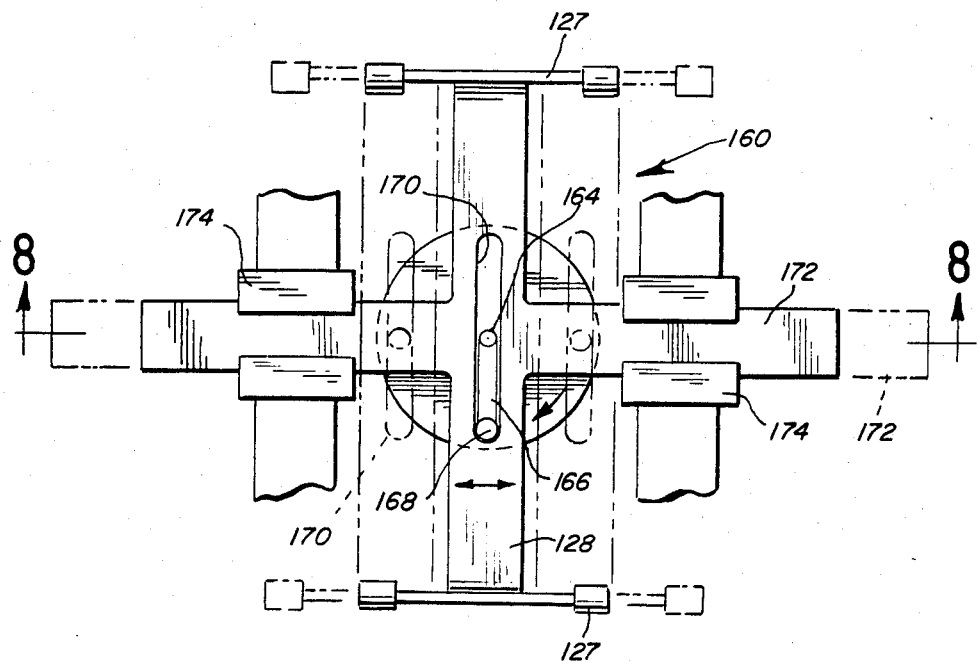
FIG. 7 is a fragmentary plan view of the drive mechanism of the apparatus of FIG. 5.
Figure 8:
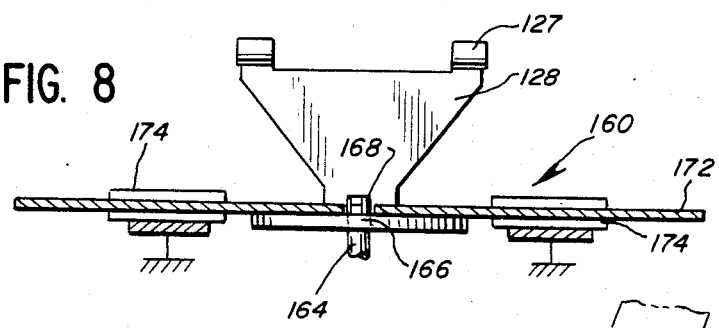
FIG. 8 is a fragmentary cross-sectional view taken substantially along line 8—8 of FIG. 7.
Figure 9:
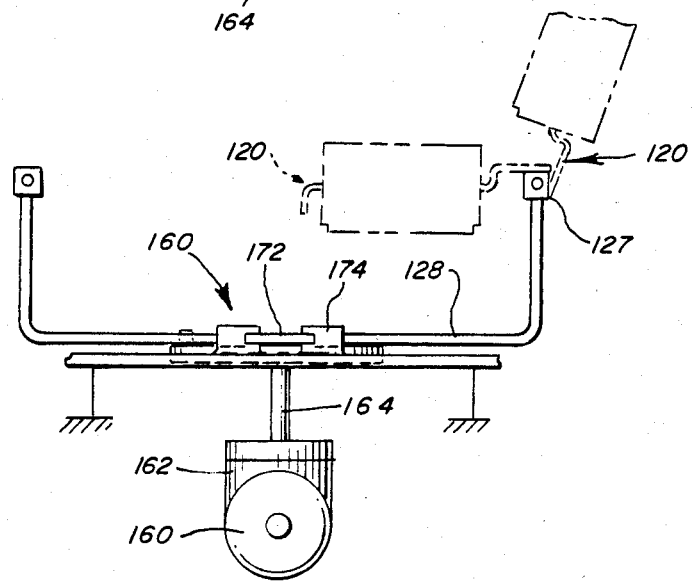
FIG. 9 is a fragmentary front elevational view of the apparatus of FIG. 5 showing a portion of the drive mechanism.

Referring first to FIGS. 1 and 2, an apparatus of the present invention comprises a grill assembly comprising a grill 8 having a grill surface 10. Desirably the grill surface 10 is a nickel-coated and surface-hardened. The nickel coating may be applied by an Electroless process. The grill surface may be provided with a peripheral trough 12 for collecting grease and debris and a splash guard 14 which may be used to facilitate the removal of grill scrapings and the like. The grill surface 10 may be electrically or gas heated in a conventional manner.

Grill 8 is suitably mounted and supported on a frame assembly 16 which also suitably serves to house controls, motors and other such elements to be described.

Frame assembly 16 also mounts a carriage 20 mounted for to and fro movement. Carriage 20 comprises a sheet metal form having a central web 22 and lateral flanges 24 and 26. At its rearward edge flange 24 is provided with a suitable bushing for pivotally securing it to a pivot rod 28. As such, carriage 20 may be disposed in the full line position shown in FIG. 1, and may also be tilted upwardly rearwardly to the dotted line position shown in FIG. 1.

Carriage 20 is adapted to be reciprocated by a suitable reciprocating mechanism which, as shown in FIG. 1, may comprise an eccentric motor driven cam 30, a vertical rod extension 32 which is secured to the flange 24 against which cam 30 acts, a compression spring 34, a guide rod 36 and a guide tube 38. Thus, as cam 30 rotates about cam shaft 31, rod extension 32 is moved to and fro against spring 34. Guide rod 36 moves in guide tube 38 to guide the carriage 20 and to stabilize it in its to and fro reciprocating movement. Desirably the flange 26 is also provided with a guide assembly, such as a guide rod and guide tube, to stabilize movement. It is not necessary, depending upon the strength of the components, to provide a motor driven cam or other complementary drive means at the other side of the carriage 20. However, it is clear that a suitable bushing for pivotally mounting the flange 26 to the guide assembly at the other side of the carriage will also be provided.

The central web 22 of carriage 20 defines a plurality of openings to receive egg rings 40. Each egg ring 40 is generally rectangular and, in the preferred embodiment, each ring 40 is about four inches square in plan view with about a one-half inch radius at each corner. Each ring is about 2½ inches high. Each egg ring floats slightly in an opening 42 in the web 22. Each opening is slightly larger than the egg ring to permit slight relative movement. Each egg ring, at its sides, is provided with a pin 44 which is received in a mounting block 46 secured to the carriage 20. The opening in the block receiving the pin is proportioned so that the ring may oscillate about the pins and may move vertically slightly, thereby to accommodate to manufacturing tolerances and slight inconsistencies in dimension, all so that the lower edge portion 48 of each egg ring may be maintained in intimate contact with the grill surface 10 in use.

Desirably the egg ring is of a non-stick, temperature resistant, dimensionally stable plastic material, such as Teflon or Delrin. Alternatively, the ring may be of metal, such as stainless steel coated with a non-stick surfacing. When a heat conductive central core material, such as metal, is used for the egg ring, some sticking will tend to occur even if a non-stick surfacing is used.

Each egg ring 40 also mounts an interceptor member or means which desirably is comb-like in configuration. Comb member 50 comprises a base 52 from which downwardly extending teeth 54 extend. The teeth 54 extend downwardly to an elevation above the grill surface 10. In one embodiment, each comb member 50 has three teeth. In side elevation the base of the comb member is about one-half inch high, the teeth are about three-eighths inch long and one-eighth inch wide. The teeth are spaced on about one inch centers and the lower edge of the teeth terminate adjacent the grill surface, about one-half inch thereabove.

The carriage 20 and egg rings 40 are adapted to move in a rapid to and fro reciprocating motion so that egg mix disposed within the egg rings 40 may be rapidly moved on the heated grill surface 10. To that end, electrical controls and a motor and motor controls are provided, and these include an on-off switch 60, a cooking cycle switch 62 which includes a circuit including an automatic timing switch responsive to the cooking cycle switch, a motor M and a conventional thermostatic control means for grill surface temperature control.

The carriage 20 is adapted to be moved, as with a suitable handle 21, from the full line operational position of FIGS. 1 and 2 to the dotted-line position of FIGS. 1 and 2 in which removal of the scrambled eggs and cleaning of the grill surface is facilitated.

In accordance with the present invention, liquid scrambled egg mix is adapted to be rapidly scrambled on the grill surface. To this end two eggs may be thoroughly pre-mixed with or without whatever condiments and additives may be desired for each egg cup. Alternatively the eggs may be disposed in the egg cup directly and may be mixed during operation of the scrambler. The grill is suitably buttered or greased (as may be the insides of the egg rings), and the carriage 20 is moved to the operational position. Two mixed eggs are then disposed in each of one or more of the egg rings, depending upon how many orders of scrambled eggs are desired at the time. The cooking cycle switch 62 is then actuated, and the carriage begins to move in its reciprocating to and fro motion. At a grill temperature of about 265° F., the preferred reciprocation (to and fro movement) at the time parent application Ser. No. 355,687 was filed was at an initial rate of about 50 strokes per minute. Each stroke was about five inches. The first portion of the then preferred 25 second cooking cycle, during which the egg mix was primarily liquid, lasted for about ten seconds at the 50 stroke per minute rate. During the initial period the liquid egg mix began to congeal and by the conclusion of the ten second initial portion of the cycle, the egg mix had lost most of its liquid characteristics. Also, during the initial portion of the cycle especially, the rapid reciprocating movement produced a wave motion in the mix so that the appearance of the egg mix was one of waves moving to and fro in the direction of reciprocation.

After about ten seconds, the motor was automatically caused to increase the rate at which it reciprocated the carriage from about 50 strokes per minute to about 100 strokes per minute. That was continued for about 15 seconds, at which time, under the conditions indicated, the cooking of the egg mix was completed and the egg mix in each ring had congealed into a mass of scrambled eggs of a fluffy, suitably moist and delectable character. The carriage could then be moved to its dotted line position and the eggs removed from the grill and the grill cleaned.

During the second more rapid portion of the cooking cycle, the eggs continued to congeal. So that they are moved and mixed appropriately, the interceptor or comb member, and particularly the teeth, act to engage, move and mix the egg mass, to tip over the mass and to mix the mass as the egg rings move to and fro.

The egg rings are configured so that the lower edge portion 48 of each egg ring 40 is maintained in intimate contact with the grill surface 10 during the cooking cycle thereby to provide an enclosed region within the egg ring and to rapidly move the egg mix within the confines of the egg ring during the cooking cycle. This is accomplished both by appropriate machining of the lower surfaces 48 and by appropriate biasing of the carriage 20 against the egg rings 40, hence against grill surface 10. However, a balance must be maintained so that undue wear of the grill surface and egg rings is avoided. Therefore, it is possible for some egg mix to escape the confines of the egg rings during the cooking cycle, although this should be maintained at a practical minimum consistent with the indicated parameters.

Referring now to the embodiment of FIG. 5, a grill assembly 108 is provided with a grill surface 110 having a suitable trough 112 and splash guard 114. Grill assembly 108 is mounted on a frame assembly 116.

A pair of carriages 120, each having a web 122 and a side flange 123, are pivotally mounted on the frame assembly via a bushing and pivot pin assembly 127 (See FIG. 6). Bushing and pivot pin assembly 127 is secured with a reciprocator plate 128 disposed outboard of the grill surface which in turn is secured to a suitable reciprocating mechanism 160.

Reciprocating mechanism 160 comprises a motor 162, a speed reducer 162 and an output shaft 164. Output shaft 164 mounts a crank 166 which in turn mounts a drive shaft 168. Drive shaft 168 is disposed in a transverse slot 170 in reciprocator plate 128. Reciprocator plate 128 also comprises a longitudinal portion 172 which is mounted for reciprocating movement in laterally disposed bearings 174.

As drive shaft 168 is driven by output shaft 164 and crank 166 it travels in a circular path bearing against the edge of slot 170 causing plate 128 to reciprocate. Of course, as it does so, it causes the connected carriages 120 to reciprocate as well.

Each carriage 120 mounts three egg rings 140 which may be mounted and secured to the carriages generally in the same manner as are carriage 20 and egg rings 40. Egg rings 140 and associated interceptor or comb members may be the same as their respective counterparts 40, 50. Alternatively, a comb member 158 may be notched into the egg ring and may have two rather than three teeth as shown by FIGS. 5 and 6. In this embodiment the egg rings may comprise an inner non-metallic confining ring portion 151, as of polytetrafluorethylene and an outer metallic mounting member 153 which are suitably supported on the web 122, as by pins 141 and keeper pins 143. The teeth 157 are about ½ inch long and may be adjacent and above the elevation of the ring portion lower surface 155.

Similarly, the operating circuitry for the grill assembly 108, in terms of the power switch and cooking cycle circuitry, may be the same as that of the embodiment of FIG. 1. The cooking cycle and relative movements and duration of the cooking cycle portions may be the same as well.

Of course, as seen, the carriages 120 move laterally to the dotted line egg removal and cleaning position rather than rearwardly as they did in the embodiment of FIG. 1. This has a number of advantages in ease of use and cleaning.

Referring now to the embodiment of FIGS. 10-13, a grill assembly 208 is provided with a grill surface 210. The grill surface may be a cold rolled steel surface. A splash guard may be provided at the rear. Grill assembly 208 is mounted on a frame assembly 216.

A pair of carriages 220, each having a central web 222 and a side mounting flange 223, are each pivotally mounted at an outer side thereof on the frame assembly via a bushing and pivot pin assembly 227 like assembly 127. Carriages 220 are secured with a reciprocating mechanism (not shown) which may be like that of the embodiment of FIGS. 5 and 6.

Each carriage 220 mounts plural egg rings such as three egg rings 240 which are mounted and secured thereto. To this end each ring comprises an outer generally rectilinear metallic mounting ring or support frame 253 and an inner, non-metallic confining ring portion 251, as of Teflon (polytetrofluoraethylene), Delrin or the like. Ring portion 251 is generally rectilinear and defines opposed apertures 252 (see FIG. 11). Frame 253 is provided with a pair of pins 254 and 255. Pins 254 and 255 project inwardly and seat within apertures 252. Because ring portion 251 is flexible, it may be secured to and released from the pins by squeezing it sufficiently to retract from the pins.

Pin 255 also extends outwardly of frame member 253. It is positioned to lie under central web 222 and serves to restrain inadvertent removal of the ring 240 from the carriage. Of course, the ring 240 may be diliberately removed by canting it in the opening 242 in the web 222, and by then lifting the ring out. In this manner, the rings 240 both are easily removable for cleaning and are protected against inadvertent disassembly from the web, as when the web and associated rings are tilted to the dotted line position of FIG. 10, as for cleaning of the grill surface.

The egg ring assembly 240 also incorporates an interceptor or comb member 258. Interceptor 258 is preferrably welded or brazed centrally to the frame 253, as at 259, and includes teeth 260 which are positioned just above the grill surface. Interceptors 258 are adapted to function just as do interceptors 52 and 158.

The embodiment of FIG. 10 also includes a stager assembly for simultaneously depositing a plurality of portions of eggs to be scrambled into the array of egg rings 240, and in accurate, consistent quantities, thereby to provide for accurate portion control. The stagers 282 are mounted on the carriages above the egg rings and are pivotally mounted on front flange 280 and rear flange 281 provided by the carriages 220. Flanges 280, 281 may be upstanding portions which are integrally formed with the webs 222. The stagers 282 each comprise a series of upstanding cups 283 secured, as by welding or brazing, to a support member, such as to a generally U-shaped strap 284. Thus cups 283 are secured to central leg 285 of strap 284. The rear leg 286 defines an aperture 287 adapted to receive a pivot pin 288 fixed with rear flange 281 (see FIG. 13). Pivot pin 288 is suitably anchored to flange 281 and preferably also mounts a bumper 289, such as an O-ring, to cushion the mount between flange 281 and the stager 282. The front leg 290 of strap 284 is also releasable from the carriage 222. To this end the carriage front flange 280 pivotally mounts a handle 291. Handle 291 comprises a bulbous handle portion and a shank 292. Shank 292 is secured to the flange 280 between plastic bearings 293. Shank 292 includes a rearwardly projecting portion 294 which defines a vertically oriented bore 295. A horizontally oriented bore 296 mounts a rearwardly spring biased bullet catch 297 which projects into vertical bore 295, all as shown in FIG. 12.

Stager 282 further includes a mounting pin 298 secured at its forward end, as to a flange provided at the upper end of front leg 290. When stager 282 is to be mounted on the carriage, the rear leg is juxtaposed with pivot pin 288 and the mounting pin 298 is thrust downwardly into bore 295 wherein bullet catch 296 springs into notch 299 in pin 298, thereby releasably securing the stager to the carriage. When the stager is to be removed, one needs only to push up on the pin 298 (or pull up on the front end of the stager) and then remove pin 298 from the bore, and then retract the rear leg 286 from pivot pin 288. Thus the stager may be easily and quickly removed for cleaning or for replacement.

In use, a suitable egg mix is provided. Quantities may then be poured into the egg cup such as to marks on the rings to provide predetermined quantities. The handles 291 are then gripped and oscillated, as from the position shown on the left in FIG. 10 (an upwardly facing egg receiving position) to the dispensing position shown on the right in FIG. 10 in which the cups are adapted to pour their contents into the underlying egg rings. Thus the eggs to be scrambled may all be deposited at the same time to assure uniform cooling of all eggs in a given cycle. Also, uniform quantities are easily and consistently provided. After the egg mix is poured out, the handles 291 are rotated to the position at the left of FIG. 10 to await further use.

As seen in FIG. 10, the handles 291 may also be used to lift and move the carriages from the operational cooking positions of FIG. 10 to the dotted line position, non-operational position of FIG. 10 at which they are supported on stops 300 wherein the grill surface is exposed for cleaning or the like. The egg rings may easily be maintained in their upstanding position as the carriages as moved to the dotted line positions, thereby avoiding spillage or dripping in the area of the grill.

The egg mix to be used may be partially premixed in a blender, and then poured into the egg cups. Although the times previously described above for cooking individual egg masses comprising about two eggs per batch were satisfactory at the time the parent application was filed, it has since been determined that another suitable cooking cycle at a grill surface temperature of about 270° F. comprises a period of about 35 seconds, with an initial cycle portion of about 25 seconds, at a rate of about 50 strokes (c. 25 cycles) per minute, and a concluding cycle portion of about ten seconds, at a rate of about 300 strokes (c.150 cycles) per minute.

The heating means and operating circuitry for the grill assembly 208 may be like that of the embodiments of FIGS. 1 and 2.

It will be apparent to those skilled in the art that various modifications may be made in the method and apparatus disclosed without departing from the spirit of the invention. For example, ring dimensions may be changed. Partial oscillatory to and fro motion may be used. The durations of the two portions of the cooking cycle may be changed and the length of the stroke may also be changed to suit particular egg mixes and to suit the taste of the user. All of these and other variations and modifications which would occur to those skilled in the art are within the spirit of the invention and are intended to be embraced herein. Accordingly, we intend to be limited only insofar as may be required by the appended claims.

What is claimed is:

1. Apparatus for producing scrambled eggs comprising a grill having a grill surface and means for heating said grill surface,
   a frame adjacent said grill,
   a carriage mounted on said frame,
   at least two egg rings mounted on said carriage, said egg rings each having a lower edge portion adapted to be disposed in intimate contact with said grill surface and for movement therealong, thereby to define with said grill surface an enclosed region within each egg ring, and
   motor means on said frame operatively connected to said carriage for rapidly reciprocating said carriage and said egg rings to and fro in a reciprocating mode along said grill surface, and wherein said reciprocating means comprises means for automatically reciprocating said carriage and said egg rings at a first rate for a first portion of said rapid movement and at a second faster rate during a second portion of said rapid movement.
   whereby liquid eggs disposed in said egg rings on said grill are adapted to be confined in said egg rings and are adapted to be moved to and fro and scrambled on said grill surface.

2. Apparatus for producing scrambled eggs in accordance with claim 1 wherein said apparatus mounts two carriages, each having at least two egg rings mounted thereon and wherein each said carriage is pivotally mounted at an outer side thereof to said means for rapidly reciprocating said carriage.

3. Apparatus for producing scrambled eggs in accordance with claim 2 wherein each said carriage is pivotally moveable from a first operational position whereat said egg rings are in contact with said grill surface to a second non-operational pivoted position in which said grill surface is exposed for cleaning.

4. Apparatus for producing scrambled eggs in accordance with claim 1, further comprising a stager, said stager being mounted on said carriage above said egg rings and providing a plurality of cups equal in number to said egg rings, and handle means for oscillating said cups from an upwardly facing egg receiving position to a second position in which each said cup is adapted to pour its contents into an underlying egg ring, said handle being adapted for lifting said carriage as well.

5. Apparatus for producing scrambled eggs comprising a grill having a grill surface and means for heating said grill surface,
   a frame adjacent said grill,
   a carriage mounted on said frame,
   at least two egg rings mounted on said carriage, said egg rings each having a lower edge portion adapted to be disposed in intimate contact with said grill surface and for movement therealong, thereby to define with said grill surface an enclosed region within each egg ring, and
   means on said frame operatively connected to said carriage for rapidly moving said carriage and said egg rings to and fro along said grill surface,
   whereby liquid eggs disposed in said egg rings on said grill are adapted to be confined in said egg rings and are adapted to be moved to and fro and cooked on said grill surface and wherein said each egg ring mounts interceptor means extending across said egg ring, the lower edge of said interceptor means being positioned above said grill surface, and at an elevation to intercept and engage said eggs as said egg rings move to and fro.

6. Apparatus for producing scrambled eggs in accordance with claim 5 wherein said interceptor means is a comb member having downwardly extending teeth, the base of said teeth defining said interceptor means lower edge.

7. Apparatus for producing scrambled eggs in accordance with claim 5 wherein each said egg ring comprises an inner non-metallic confining ring and an outer mounting member.

8. Apparatus for producing scrambled eggs in accordance with claim 7 wherein said confining ring is removably secured to said outer mounting ring.

9. Apparatus for producing scrambled eggs in accordance with claim 5 wherein each said egg ring is readily removably mounted on said carriage.

10. Apparatus for concurrently producing a plurality of individual masses of scrambled eggs comprising a grill having a grill surface and means for heating said grill surface,
    a frame adjacent said grill,
    a pair of carriages separately and pivotally mounted on said frame,
    at least two egg rings removably mounted on each said carriage, each said ring having a lower edge portion adapted to be disposed in intimate contact with said grill surface and for movement therealong, thereby to define with said grill surface an enclosed region within each egg ring for producing an individual mass of scrambled eggs,
    means on said frame operatively connected to each said carriage for rapidly reciprocating each said carriage and the associated said egg rings to and fro along said grill surface,
    whereby liquid eggs disposed in each of said egg rings on said grill are adapted to be confined in said egg rings and are adapted to be reciprocated and cooked on said grill surface.

11. Apparatus for producing scrambled eggs in accordance with claim 10 wherein each said egg ring mounts tooth-like interceptor means extending across each said egg ring, the lower edge of said interceptor means being positioned above said grill surface, and at an elevation to intercept and engage said eggs as said egg rings are reciprocated.

12. Apparatus for producing scrambled eggs in accordance with claim 10 wherein said reciprocating means comprises means for automatically reciprocating said carriage and said egg rings at a first rate for a first portion of said rapid movement and at a faster rate during a second portion of said rapid movement.

13. Apparatus for producing scrambled eggs in accordance with claim 10 wherein said carriages are each pivotally mounted at an outer side thereof to said reciprocating means and are moveable from a first operating position in which said egg rings are in contact with said grill surface to a second non-operational position in which said grill surface is exposed for cleaning.

14. Apparatus for producing scrambled eggs in accordance with claim 10, further comprising a stager, said stager being mounted on said carriage above said egg rings and providing a plurality of cups equal in number to said egg rings, and means for oscillating said cups from an upwardly facing egg receiving position to a second position in which each said cup is adapted to pour its contents into an underlying egg ring.

15. Apparatus for producing scrambled eggs in accordance with claim 14 and wherein said oscillating means comprises a handle adapted for lifting said carriage as well.

16. Apparatus for producing scrambled eggs in accordance with claim 14 wherein said stager is removably mounted on said carriage.

* * * * *